US009090064B2

(12) United States Patent
Nihei

(10) Patent No.: US 9,090,064 B2
(45) Date of Patent: Jul. 28, 2015

(54) METHOD OF MANUFACTURING LIQUID DROPLET EJECTION HEAD

(71) Applicant: FUJIFILM CORPORATION, Tokyo (JP)

(72) Inventor: Yasukazu Nihei, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 276 days.

(21) Appl. No.: 13/665,460

(22) Filed: Oct. 31, 2012

(65) Prior Publication Data

US 2013/0111753 A1 May 9, 2013

(30) Foreign Application Priority Data

Nov. 8, 2011 (JP) ................................ 2011-244690

(51) Int. Cl.

| | |
|---|---|
| ***B21D 53/76*** | (2006.01) |
| ***B23P 17/00*** | (2006.01) |
| ***B41J 2/14*** | (2006.01) |
| ***B41J 2/16*** | (2006.01) |

(52) U.S. Cl.

CPC ................ *B41J 2/1433* (2013.01); *B41J 2/162* (2013.01); *B41J 2/1606* (2013.01); *Y10T 29/49401* (2015.01)

(58) Field of Classification Search

CPC ...... B41J 2/1606; B41J 2/1642; B41J 2/1433; B41J 2/162; B41J 2002/1425; B41J 2002/14362; B41J 2219/00378; H05K 3/1241

USPC ................ 29/890.1, 428, 454, 458, 890.142; 347/44, 45, 47, 64, 71

See application file for complete search history.

(56) References Cited

U.S. PATENT DOCUMENTS

| | | | | |
|---|---|---|---|---|
| 5,559,542 | A | 9/1996 | Tsukuda | |
| 8,733,897 | B2 * | 5/2014 | Okamura | ........................ 347/45 |
| 2011/0063369 | A1 | 3/2011 | Okamura | |

FOREIGN PATENT DOCUMENTS

| | | | |
|---|---|---|---|
| JP | H05-293964 | A | 11/1993 |
| JP | H11-138824 | A | 5/1999 |
| JP | 2003-063014 | A | 3/2003 |
| JP | 2007-261070 | A | 10/2007 |
| JP | 2008-221653 | A | 9/2008 |

(Continued)

OTHER PUBLICATIONS

An Office Action; "Notice of Reasons for Rejection," issued by the Japanese Patent office on Sep. 2, 2014, which corresponds to Japanese Patent Application No. 2011-244690 and is related to U.S. Appl. No. 13/665,460; with English language translation.

(Continued)

*Primary Examiner* — Thiem Phan

(74) *Attorney, Agent, or Firm* — Studebaker & Brackett PC

(57) ABSTRACT

An object of the invention is to provide a method of manufacturing a liquid droplet ejection head that is capable of realizing cost reduction by a simple process and obtaining ejection reliability over a long period of time. The method includes: forming a water repellent film on a nozzle forming substrate having a nozzle hole and inside the nozzle hole; adhering a protective film on the water repellent film that is formed on the surface of the nozzle forming substrate; removing the water repellent film formed inside the nozzle by a plasma treatment; and peeling the protective film, wherein polysiloxane is not contained in an adhesion component and a base material of the protective film.

18 Claims, 7 Drawing Sheets

(56) References Cited

FOREIGN PATENT DOCUMENTS

| | | | |
|---|---|---|---|
| JP | 4374811 | B2 | 12/2009 |
| JP | 2011-121357 | A | 6/2011 |

OTHER PUBLICATIONS

An Office Action; "Notice of Reasons for Rejection," issued by the Japanese Patent office on Dec. 3, 2013, which corresponds to Japanese Patent Application No. 2011-244690 and is related to U.S. Appl. No. 13/665,460; with English language translation.

* cited by examiner

METHOD OF MANUFACTURING LIQUID DROPLET EJECTION HEAD

BACKGROUND OF THE INVENTION

1. Field of the Invention

The present invention relates to a method of manufacturing a liquid droplet ejection head, and more particularly, to a method of manufacturing a liquid droplet ejection head provided with a water repellent film on a surface of a nozzle plate of the liquid droplet ejection head.

2. Description of the Related Art

In the liquid droplet ejection head that is used in the liquid droplet ejection device, for example, in an ink-jet recording device, when ink is adhered to a surface of the nozzle plate, an ink droplet ejected from a nozzle is affected, and thus a variance may occur in an ejection direction of the ink droplet. When the ink is adhered, it is difficult to cause the ink droplet to land at a predetermined position on a recording medium, and thus this becomes a cause of deteriorating an image quality.

Therefore, a water repellent film is formed on the surface of the nozzle plate so as to prevent ink from being adhered to the surface of the nozzle plate and to improve an ejection performance. When the water repellent film is formed on the surface of the nozzle plate, a meniscus is formed in a nozzle section. The meniscus, which is formed at the nozzle section in this manner, prevents a liquid (ejection liquid) ejected from the nozzle from overflowing from the nozzle. When the water repellent film is not provided on the surface of the nozzle plate, the ejection liquid overflows to the surface, and thus it is difficult to control an accurate ejection volume or an ejection direction. In addition, when the water repellent film is formed on the surface of the nozzle plate, it is possible to cause waste such as paper dust, foreign matter, and dried matter from liquids to be not likely to adhere to the surface of the nozzle plate and solidify. When liquid is adhered to the surface of the nozzle plate, this leads to adhesion of the waste, foreign matter, solidified matter, or the like. In addition, the surface of the nozzle plate is generally wiped during periodic maintenance. However, when foreign matter, solidified matter, or the like is adhered to the inside of the nozzle during wiping, ejection is significantly hindered.

On the other hand, in the case of forming the water repellent film on the surface of the nozzle plate, when the water repellent film is formed in a state in which the nozzle is opened, the water repellent film is also adhered to the inside of the nozzle. When the water repellent film is formed inside the nozzle, a meniscus is formed at a position further inside the nozzle. As a result, the ejection volume or the ejection direction becomes unstable, and thus a non-ejection may occur. In addition, when the inside of the nozzle is to be filled with liquid, wettability is poor, and thus air bubbles are easily become entrained. When the air bubbles are entrained, non-ejection may occur in the nozzle. In addition, the air bubbles propagate inside the filled liquid and transit to other nozzles, whereby other nozzles are affected. Therefore, as a method of removing the water repellent film adhered to the inside of the nozzle, various methods have been reviewed.

For example, as a method of removing the water repellent film that flows to the inside of the nozzle and is adhered thereto, JP2007-261070A discloses a method in which the surface of the nozzle is protected by an elastic body or a masking material and an inner water repellent film is removed by plasma from an inner side of the nozzle. JP2008-221653A discloses a method in which a liquid repellent film is formed on the surface of the nozzle plate, a protective member is provided to a nozzle opening and the periphery thereof in a non-adhesive manner, and the liquid repellent film is removed. In addition, JP4374811B discloses a method in which a photosensitive resin is used as the protective member, and the inner water repellent film is removed by plasma from the inner side of the nozzle.

SUMMARY OF THE INVENTION

In the method disclosed in JP2007-261070A, JP2008-221653A, and JP4374811B, since the protective member is used, and thus it is necessary to remove the protective member after a plasma treatment. Therefore, a protective member removing property (handling property), and a surface cleaning property during removal of the protective member are important. Therefore, it is necessary to perform a wet treatment during peeling of the protective member, and to perform a cleaning treatment after the peeling, but these treatments increase the number of production processes, thereby leading to non-effectiveness. Furthermore, a wet treatment liquid permeates into the inside of the nozzle, and thus this leads to a problem from the viewpoint of contamination of the nozzle and an inner flow path.

In addition, in the protecting film that protects the nozzle plate, a residue of an adhesive material on a surface of the nozzle plate and adhesion of a plasma treatment product to the surface of the nozzle plate and the inside of the nozzle along with the plasma treatment serve as important factors. That is, contaminants, which are scattered due to interaction between components of the protective member (protective film) and plasma, adhere to the inside of the nozzle, and an ejected liquid component primarily adheres to a portion to which the contaminants adhere and solidifies. Therefore, ejection volume and ejection directionality vary with the passage of time, and thus it is difficult to stably control the ejection.

The invention was made in consideration of the above-described circumstances, and an object thereof is to provide a method of manufacturing a liquid droplet ejection head that is capable of realizing cost reduction by a simple process and obtaining ejection reliability over a long period of time.

According to an aspect of the invention, there is provided a method of manufacturing a liquid droplet ejection head including: forming a water repellent film on a surface of a nozzle forming substrate having a nozzle hole and on a side wall of the nozzle hole; adhering a protective film on a surface of the water repellent film that is formed on the surface of the nozzle forming substrate; removing the water repellent film formed on the side wall of the nozzle hole by a plasma treatment; and peeling the protective film, wherein polysiloxane is not contained in an adhesion component and a base material of the protective film.

The present inventor has found that a factor, which decreases water repellency of the water repellent film and thus has a large effect on destabilization in long-term reliability of an ejection performance, is polysiloxane that is a release agent component contained in the protective film adhered to remove the water repellent film inside the nozzle hole. The release agent component is added to peel the protective film after removing the water repellent film inside the nozzle hole.

In the aspect of the invention, since the protective film not containing the polysiloxane is used, it is possible to prevent the polysiloxane from adhering to a surface of the water repellent film.

The polysiloxane promotes adhesion and solidification of a pigment component of ink. Therefore, by using a film not containing the polysiloxane as the protective film, the water repellency of the water repellent film may be maintained. As a result, the long-term ejection reliability may be obtained.

In addition, since the protective film not containing the polysiloxane component is used, a cleaning process of cleaning the polysiloxane after peeling the protective film is not necessary. Therefore, process cost reduction may be realized by a simple process.

In addition, since an object to which the protective film is adhered is the water repellent film, even in a case where the polysiloxane is not contained, the protective film may be easily peeled. As the polysiloxane, polydimethylsiloxane may be exemplified.

According to another aspect of the invention, in the method of manufacturing the liquid droplet ejection head, it is preferable that, before the forming of the water repellent film, a flow path forming substrate, in which a flow path through which an ejected liquid flows and a pressure chamber are formed, be adhered to the nozzle forming substrate, and a piezoelectric element for driving and an interconnection be formed in the flow path forming substrate.

In the aspect of the invention, the formation of the water repellent film is performed in a state in which the flow path forming substrate is adhered to the nozzle forming substrate in which the water repellent film is to be formed, and the piezoelectric element for driving and the interconnection are formed in the flow path forming substrate. It is preferable that the formation of the water repellent film be performed at the final stage of the manufacturing of the liquid droplet ejection head. In a case where the water repellent film is formed first in the nozzle forming substrate, for example, there is a problem in that foreign matter may adhere to the water repellent film at subsequent processes, or a problem in that heat is applied at the formation, and thus the water repellent film may deteriorate.

In addition, since the piezoelectric element and the interconnection are formed before forming the water repellent film, it is preferable that the protective film be peeled without performing irradiation of energy such as heat and UV. In a case where heat or UV is applied during the peeling, the piezoelectric element formed in the liquid droplet ejection head or a resin used during the adhesion may deteriorate, and thus this is not preferable. However, according to the aspect of the invention, since an object to which the protective film is adhered is the water repellent film, even in a case where the energy irradiation is not performed and the protective film does not contain the polysiloxane as the releasing agent, the protective film may be easily peeled.

According to still another aspect of the invention, in the method of manufacturing the liquid droplet ejection head, it is preferable that the protective film have air escape property. In the present aspect of the invention, the "air escape property" refers to a property which prevents or reduces the occurrence of residual air babbles.

In the aspect of the invention, a film having the air escape property, is used as the protective film. Having the air escape property, the protective film may be adhered to the water repellent film without being floated. Therefore, removal of the water repellent film on the nozzle forming substrate may be reduced.

According to still another aspect of the invention, in the method of manufacturing the liquid droplet ejection head, it is preferable that the protective film is optically transparent. In the aspect of the invention, since the optically transparent film is used as the protective film, in a case where a float occurs between the protective film and the water repellent film, such float may be visually confirmed.

According to still another aspect of the invention, in the method of manufacturing the liquid droplet ejection head, it is preferable that the protective film have a release film on at least one surface thereof, the release film containing polysiloxane, and the method further include peeling the release film from the protective film before the adhering of the protective film.

In the aspect of the invention, although the protective film does not contain the polysiloxane, the release film may be easily peeled from the protective film since the polysiloxane is contained in the release film that protects the protective film before usage.

According to still another aspect of the invention, in the method of manufacturing the liquid droplet ejection head, it is preferable that the adhering of the protective film be performed under the condition in which the inside of the nozzle hole is decompressed.

In the aspect of the invention, since the adhering of the protective film is performed under the condition in which the inside of the nozzle is decompressed, the protective film may be adhered in a close contact state without being floated on the water repellent film on the surface of the nozzle forming substrate. Therefore, the water repellent film on the surface of the nozzle forming substrate may be prevented from being removed.

According to still another aspect of the invention, in the method of manufacturing the liquid droplet ejection head, it is preferable that the adhering of the protective film be performed under a heated atmosphere.

In the aspect of the invention, since the adhesion of the protective film is performed under a heated atmosphere, the material of the protective film may be made to be soft. Therefore, the protective film may be adhered on the water repellent film without being floated.

According to still another aspect of the invention, in the method of manufacturing the liquid droplet ejection head, it is preferable that, in the forming of the water repellent film, the water repellent film be formed from a fluorine-based silane coupling agent.

In the aspect of the invention, since the water repellent film is formed from a fluorine-based silane coupling agent, water repellency of the water repellent film may be improved, and at the same time, a release property of the protective film from the water repellent film may be maintained.

According to still another aspect of the invention, in the method of manufacturing the liquid droplet ejection head, it is preferable that, in the forming of the water repellent film, the water repellent film be formed by vapor deposition of a fluorine-based silane coupling agent.

According to the invention, since the formation of the water repellent film is performed by the vapor deposition method, a dense film may be formed.

According to still another aspect of the invention, in the method of manufacturing the liquid droplet ejection head, it is preferable that, in the removing of the water repellent film, the plasma treatment be performed by a vacuum decompression plasma treatment.

In the aspect of the invention, since the plasma treatment is performed in the vacuum decompression plasma treatment, the removal of the water repellent film may be effectively performed.

According to still another aspect of the invention, in the method of manufacturing the liquid droplet ejection head, it is preferable that, in the removing of the water repellent film, the plasma treatment be performed by an atmospheric pressure plasma treatment using gas flow.

According to the invention, since the plasma treatment is performed by an atmospheric pressure plasma treatment using gas flow, the removal of the water repellent film may be effectively performed.

According to the method of manufacturing the liquid droplet ejection head of the invention, since the surface of the nozzle forming substrate is protected by a protective film not including polysiloxane, the polysiloxane may be prevented from being adhered to the surface of the nozzle plate by the plasma irradiation to remove the water repellent film inside the nozzle. Therefore, adhesion of ink due to the polysiloxane may be prevented, and thus ejection reliability may be obtained over a long period of time.

DESCRIPTION OF THE PREFERRED EMBODIMENTS

Hereinafter, preferred embodiments of the invention will be described with reference to the attached drawings.

Overall Configuration of Inkjet Recording Device

First, description will be made with respect to an inkjet recording device as a liquid droplet ejection device to which a liquid droplet ejection head manufactured by a method of manufacturing a liquid droplet ejection head of the invention is applied.

Figure 1:
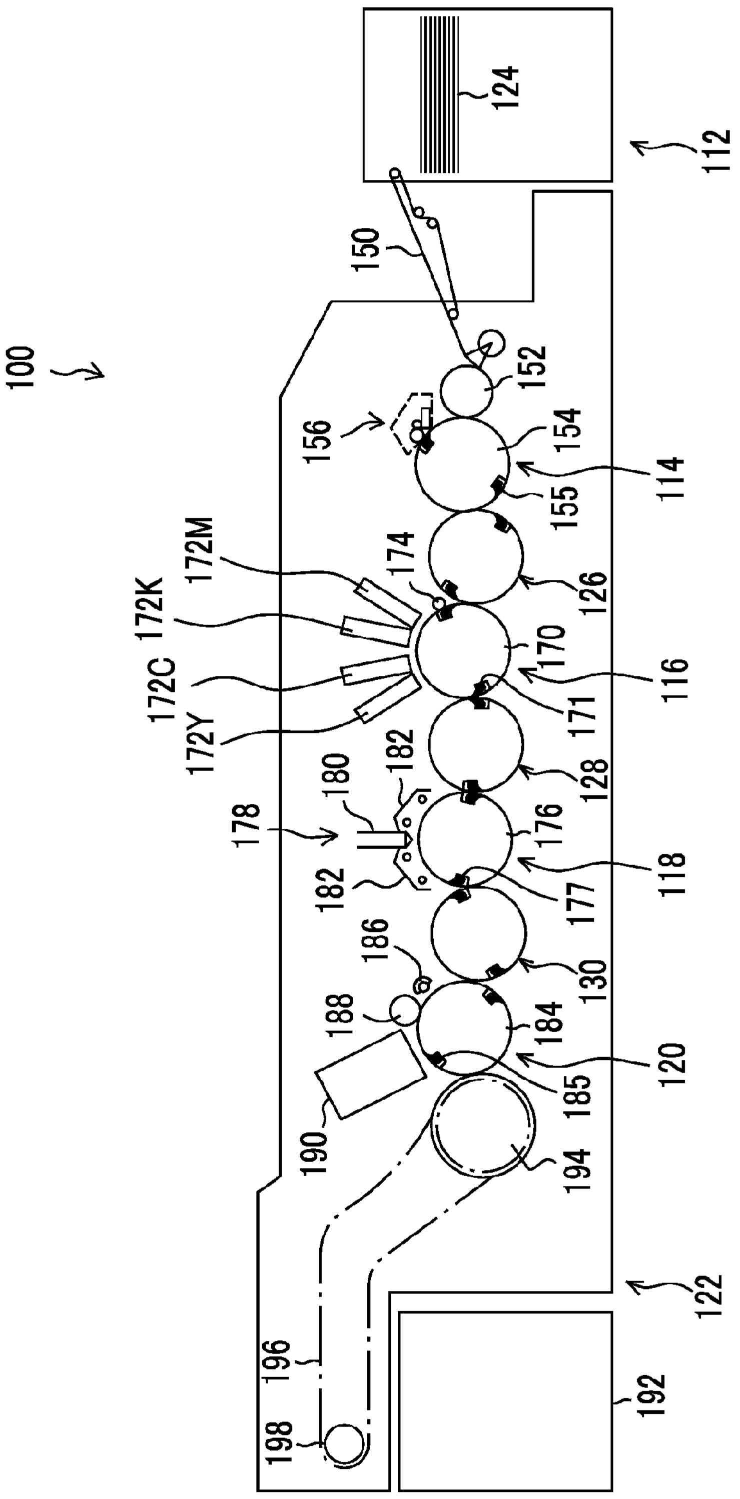
FIG. 1 is an entire configuration diagram schematically illustrating an inkjet recording device.

FIG. 1 shows a configuration diagram of an inkjet recording device. An inkjet recording device 100 is an impression-cylinder direct-drawing inkjet recording device that forms a desired color image by ejecting inks of a plurality of colors from inkjet heads 172M, 172K, 172C, and 172Y as liquid droplet ejection heads onto a recording medium 124 (may be referred to as “sheet” for convenience) that is held at an impression cylinder (an image drawing drum 170) of an image drawing section 116. The inkjet recording device 100 is an on-demand type image forming device, to which a two-liquid reaction (agglomeration) method, which carries out image formation on the recording medium 124 by applying a processing liquid (here, an agglomeration treatment liquid) onto the recording medium 124 before ejecting ink, and causing the treatment liquid and the liquid inks to react, is applied.

As shown in FIG. 1, the inkjet recording device 100 includes a sheet feeding section 112, a treatment liquid applying section 114, the image drawing section 116, a drying section 118, a fixing section 120, and a discharging section 122.

Sheet Feeding Section

The sheet feeding section 112 is a mechanism that feeds the recording medium 124 to the treatment liquid applying section 114. The recording medium 124, which is a sheet, is stacked in the sheet feeding section 112. A sheet feed tray 150 is provided at the sheet feeding section 112, and the recording medium 124 is fed one-by-one from the sheet feed tray 150 to the treatment liquid applying section 114.

Treatment Liquid Applying Section

The treatment liquid applying section 114 is a mechanism that applies treatment liquid to a recording surface of the recording medium 124. The treatment liquid contains a coloring material agglomerating agent that agglomerates a coloring material (in this example, a pigment) within the ink that is applied at the image drawing section 116. When the treatment liquid and the ink come into contact with each other, separation of the ink into the color material and a solvent is promoted.

As shown in FIG. 1, the treatment liquid applying section 114 includes a sheet feeding cylinder 152, a treatment liquid drum 154, and a treatment liquid applying device 156. The treatment liquid drum 154 is a drum that holds the recording medium 124, and rotates and conveys the recording medium 124. Claw-shaped holding means (gripper) 155 is provided on the outer circumferential surface of the treatment liquid drum 154, and the leading end of the recording medium 124 may be held by nipping the recording medium 124 between the claws of the holding means 155 and the circumferential surface of the treatment liquid drum 154.

The treatment liquid applying device 156 is provided at the outer side of the treatment liquid drum 154 so as to be opposite to the circumferential surface thereof. The treatment liquid applying device 156 includes a treatment liquid container in which the treatment liquid is stored, an anilox roller of which part is immersed in treatment liquid in the treatment liquid container, and a rubber roller that comes into pressing contact with the anilox roller and the recording medium 124 on the treatment liquid drum 154 and delivers the treatment liquid after being weighed to the recording medium 124. According to the treatment liquid applying device 156, the treatment liquid may be applied to the recording medium 124 while being weighed.

The recording medium 124 to which the treatment liquid is applied by the treatment liquid applying section 114 is delivered to the image drawing drum 170 of the image drawing section 116 from the treatment liquid drum 154 through an intermediate conveying section 126.

Image Drawing Section

The image drawing section 116 includes the image drawing drum (second conveying body) 170, a sheet pressing roller 174, and inkjet heads 172M, 172K, 172C, and 172Y. Similarly to the treatment liquid drum 154, the image drawing drum 170 is provided with claw-shaped holding means (gripper) 171 on the outer circumferential surface thereof. The recording medium 124 fixed to the image drawing drum 170 is conveyed in such a manner that a recording surface faces an outer side, and ink is applied to the recording surface from the inkjet heads 172M, 172K, 172C, and 172Y.

The inkjet heads 172M, 172K, 172C, and 172Y are preferably set to a recording head (inkjet head) of a full line type inkjet system having a length corresponding to the maximum width of an image forming region in the recording medium 124, respectively. A nozzle array in which a plurality of nozzles for ink ejection are arrayed is formed on an ink ejection face over the entire width of the image forming region. The respective inkjet heads 172M, 172K, 172C, and 172Y are provided to extend in a direction orthogonal to the conveyance direction of the recording medium 124 (rotation direction of the image drawing drum 170).

When a liquid droplet of corresponding color ink is ejected from each of the inkjet heads 172M, 172K, 172C, and 172Y toward the recording surface of the recording medium 124 that is held on the image drawing drum 170 in a close contact manner, the ink comes into contact with the treatment liquid that is applied in advance to the recording surface at the treatment liquid applying section 114, and a coloring material (pigment) that is dispersed in the ink agglomerates and thus a coloring material agglomerate is formed. As a result, flow of the coloring material on the recording medium 124 is hindered, and thus an image is formed on the recording surface of the recording medium 124.

The recording medium 124 on which an image is formed at the image drawing section 116 is delivered to a drying drum 176 of the drying section 118 from the image drawing drum 170 through an intermediate conveying section 128.

Drying Section

The drying section 118 is a mechanism that dries moisture contained in the solvent separated by a coloring agent agglomeration operation, and is provided with a drying drum 176 and a solvent drying device 178 as shown in FIG. 1.

Similarly to the treatment liquid drum 154, the drying drum 176 is provided with claw-shaped holding means (gripper) 177 on the outer circumferential surface thereof, and the leading end of the recording medium 124 may be held by the holding means 177.

The solvent drying device 178 is disposed at a position that is opposite to the outer circumferential surface of the drying drum 176, and includes a plurality of halogen heaters 180 and warm air blowing nozzles 182 that are disposed between the halogen heaters 180, respectively.

The recording medium 124 that is dried at the drying section 118 is delivered to a fixing drum 184 of the fixing section 120 from the drying drum 176 through an intermediate conveying section 130.

Fixing Section

The fixing section 120 includes the fixing drum 184, a halogen heater 186, a fixing roller 188, and an inline sensor 190. Similarly to the treatment liquid drum 154, the fixing drum 184 is provided with claw-shaped holding means (gripper) 185 on the outer circumferential surface, and the leading end of the recording medium 124 may be held by the holding means 185.

Due to the rotation of the fixing drum 184, the recording medium 124 is conveyed in such a manner that the recording surface of the recording medium 124 faces an outer side, and preliminary heating by the halogen heater 186, a fixing treatment by the fixing roller 188, and examination by the inline sensor 190 are performed with respect to the recording surface.

According to the fixing section 120, since thermoplastic resin fine particles in a thin image layer, which is formed at the drying section 118, are heated and compressed by the fixing roller 188 and are melted, the thermoplastic resin fine particles may be fixed to the recording medium 124. In addition, when a surface temperature of the fixing drum 184 is set to 50° C. or higher, the recording medium 124, which is held on the outer circumferential surface of the fixing drum 184, is heated from the rear surface side and drying is promoted. Therefore, an image may be prevented from being destroyed during fixation, and image strength may be increased due to a temperature rising effect of the image temperature.

In addition, in a case where a UV-curable monomer is contained in the ink, when the image is irradiated with UV at the fixing section provided with a UV irradiation lamp after moisture is sufficiently evaporated at the drying section, the UV curable monomer is cured and polymerized, and thus the image strength may be improved.

Discharging Section

As shown in FIG. 1, the discharging section 122 is provided to be continuous with the fixing section 120. The discharging section 122 is provided with a discharging tray 192, and a delivery cylinder 194, a conveying belt 196, and a stretching roller 198 are provided between the discharging tray 192 and the fixing drum 184 of the fixing section 120 to come into contact with these. The recording medium 124 is transmitted to the conveying belt 196 by the delivery cylinder 194, and is discharged to the discharging tray 192.

In addition, although not shown in the drawing, in addition to the above-described configurations, the inkjet recording device 100 is provided with not only an ink storing and charging section that supplies ink to the respective inkjet heads 172M, 172K, 172C, and 172Y, and means for supplying the treatment liquid to the treatment liquid applying section 114, but also a head maintenance section that performs cleaning (wiping and purging of a nozzle surface, nozzle suction, and the like) of the respective inkjet heads 172M, 172K, 172C, and 172Y, a position detection sensor that detects a position of the recording medium 124 on a sheet conveying path, a temperature sensor that detects a temperature of each section of the device, and the like.

In addition, in FIG. 1, description was made with respect to an inkjet recording device of a drum conveyance type. However, the invention is not limited thereto, and may be used in an inkjet recording device of a belt conveyance type, and the like.

Structure of Inkjet Head

Next, a structure of the inkjet heads 172M, 172K, 172C, and 172Y will be described. In addition, the structure of the respective inkjet heads 172M, 172K, 172C, and 172Y is common, and thus in the following description, these inkjet heads are collectively represented as an inkjet head indicated by a reference numeral 250.

Figure 2A:
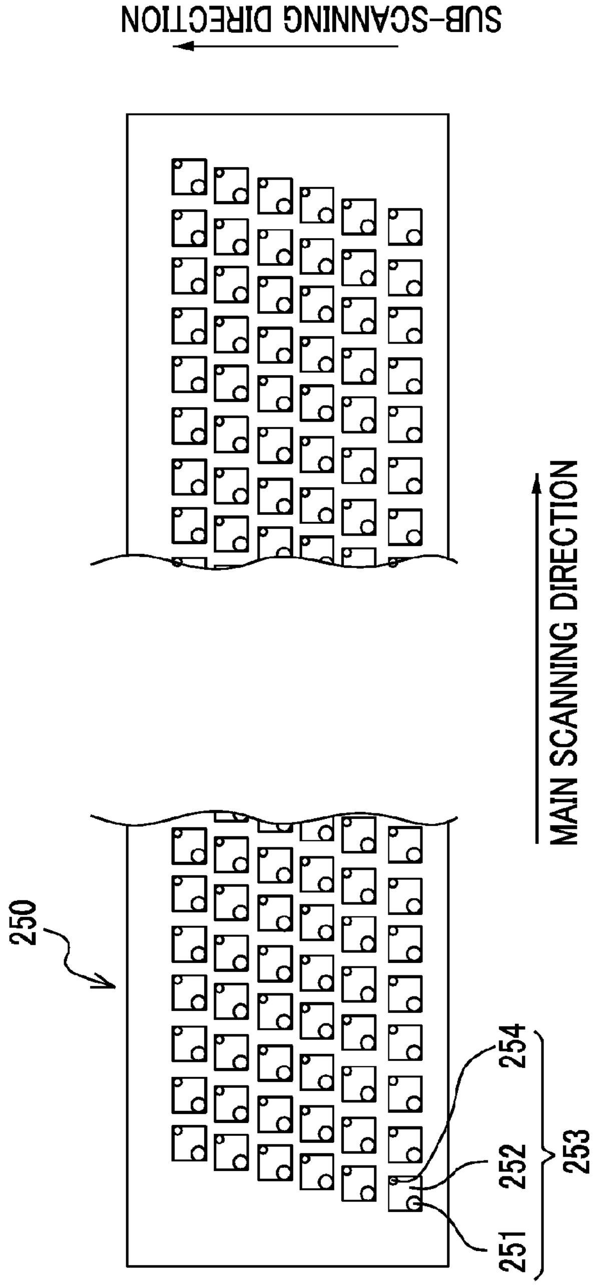
FIGS. 2A and 2B are planar perspective diagrams illustrating a structural example of an inkjet head.
Figure 2B:
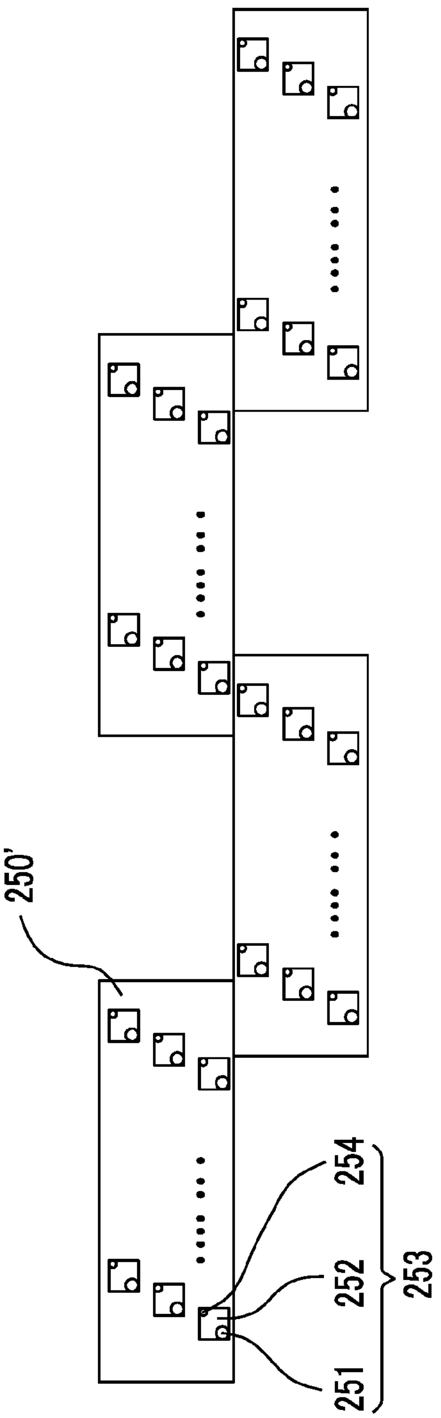
Figure 3:
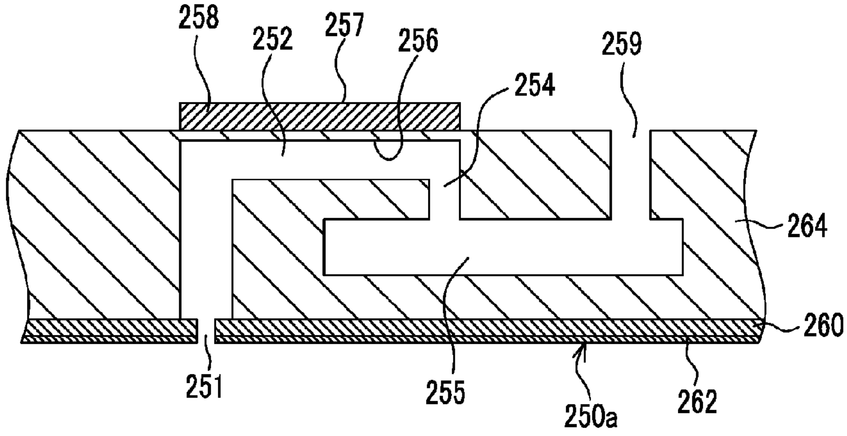
FIG. 3 is a cross-sectional diagram illustrating a stereoscopic configuration of an ink chamber unit.

FIG. 2A shows a planar perspective diagram illustrating a structural example of an inkjet head 250, and FIG. 2B shows a planar perspective diagram illustrating a different structural example of the inkjet head 250. FIG. 3 shows a cross-sectional diagram illustrating a stereoscopic configuration of an ink chamber unit.

To realize high density of a dot pitch that is formed on the recording paper, it is necessary for a nozzle pitch in the inkjet head 250 to be highly dense. As shown in FIG. 2A, the inkjet head 250 of this example has a configuration in which a plurality of inkjet chamber units 253 are disposed in a matrix state (two dimensionally) with a zigzag style, each inkjet chamber unit including a nozzle 251 as an ejection hole of an inkjet droplet and a pressure chamber 252 corresponding to each nozzle 251, and the like. According to this configuration, high density of a substantial nozzle interval (projection nozzle pitch) that is projected to be parallel with a longitudinal direction (a main scanning direction orthogonal to a sheet conveying direction) of the inkjet head is accomplished.

A type in which one or more nozzle rows are configured over the length corresponding to the entire width of the recording medium 124 in a direction that is approximately orthogonal to the sheet conveying direction is not limited to this example. For example, instead of the configuration of FIG. 2A, as shown in FIG. 2B, short head blocks (head tips) 250' in which the plurality of nozzles 251 are two-dimensionally arranged may be arranged in a zigzag shape and connected to each other to configure a line head having a nozzle row with a length corresponding to the entire width of the recording medium 124. In addition, although not shown, short heads may be arranged in a line to configure the line head.

As shown in FIG. 3, each of the nozzles 251 is formed in a nozzle plate 260 (nozzle forming substrate) making up the ink ejection face 250*a* of the inkjet head 250. The nozzle plate 260 is formed from, for example, a silicon-based material such as Si, $SiO_2$, SiN, and quartz glass, a metal-based material such as Al, Fe, Ni, Cu, and an alloy including these, an oxide material such as alumina and iron oxide, a carbon-based material such as carbon black and graphite, and a resin-based material such as polyimide.

A water repellent film 262 having water repellency with respect to ink is formed on a surface (ink ejection side surface) of the nozzle plate 260, and thus prevention of ink attachment is realized.

The nozzle plate 260 is adhered to a flow path forming substrate 264, and a pressure chamber 252 is provided in the flow path forming substrate 264 in correspondence with each of the nozzles 251. The pressure chamber 252 has an approximately rectangular planar shape. The nozzle 251 and a supply port 254 are provided at both corner portions on a diagonal line of the pressure chamber 252. Each pressure chamber 252 communicates with a common flow path 255 through the supply port 254. The common flow path 255 communicates with an ink supply tank (not shown) that is an ink supply source through an ink supply port 259, and ink supplied from the ink supply tank is distributed and supplied to each pressure chamber 252 through the common flow path 255. In addition, the common flow path 255 is provided in common with the ink chamber unit 253 in the sub-scanning direction shown in FIG. 2A, and thus the ink supply port 259 that supplies ink to the common flow path 255 may be provided to the common flow path 255 at one place.

A piezoelectric element 258 including an individual electrode 257 is adhered to a vibration plate 256 that makes up a top side of the pressure chamber 252 and also serves as a common electrode. When a driving voltage is applied to the individual electrode 257, the piezoelectric element 258 is deformed, and thus ink is ejected from the nozzle 251. When ink is ejected, new ink is supplied to the pressure chamber 252 from the common flow path 255 through the supply port 254. In addition, although not shown, an interconnection that is used to apply a voltage to the individual electrode 257 is provided in the flow path forming substrate 264.

In addition, an arrangement structure of the nozzle is not limited to the example that is shown, and various nozzle arrangement structures such as an arrangement structure having a nozzle row of one row in a sub-scanning direction may be applied.

In addition, there is no limitation to a printing type using a line-type head, and a serial type may be applied. In the serial type, a head, which is shorter than the length of a sheet in a lateral direction (main scanning direction), is scanned in the lateral direction of the sheet to perform printing in the lateral direction, and the sheet on which the printing in the lateral direction is performed one time is made to move in a predetermined amount in a direction (sub-scanning direction) orthogonal to the lateral direction to perform the printing in the lateral direction of the sheet within the next printing region. These operations are repeated to perform the printing over the entire surface of the printing region of the sheet.

Method of Forming Water Repellent Film

Next, a method of forming the water repellent film that is provided to the liquid droplet ejection head will be described.

FIGS. 4A to 4E show process diagrams illustrating a method of forming the water repellent film that is provided to the liquid droplet ejection head related to the invention. The method of forming the water repellent film includes (1) a water repellent film forming process that forms the water repellent film on a surface of the nozzle plate and inside the nozzle, (2) a protective film adhering process that adheres the protective film on a surface of the water repellent film on the surface of the nozzle plate, (3) a plasma irradiation process that removes the water repellent film inside the nozzle by a plasma treatment, and (4) a protective film peeling process that peels the protective film. Hereinafter, the respective processes will be described in detail.

(1) Water Repellent Film Forming Process

Figure 4A:
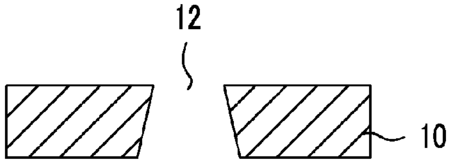
FIGS. 4A to 4E are process diagrams illustrating a method of forming a water repellent film.
Figure 4B:
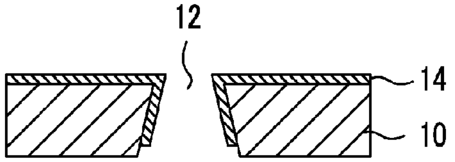

As shown in FIGS. 4A and 4B, a water repellent film 14 is formed in the nozzle forming substrate (i.e., on a nozzle plate 10) having a nozzle 12. The nozzle plate 10, the nozzle 12, and the water repellent film 14 in FIGS. 4A and 4B correspond to the nozzle plate 260, the nozzle 251, and the water repellent film 262 shown in FIG. 3, respectively. As the nozzle plate 10, it is preferable to use a nozzle plate 10 in a state in which the pressure chamber 252, the vibration plate 256, the piezoelectric element 258 for driving, and an interconnection such as a flexible cable are formed in advance. That is, the formation of the water repellent film 14 is preferably performed in the final stage of manufacturing of the inkjet head 250. In a case where processing of the inkjet head 250 is performed after the water repellent film 14 is formed on the surface of the nozzle plate 10, foreign matter during the machining may adhere onto the water repellent film 14. Further, in a case where heat is applied during formation of the inkjet head 250, the heat may cause a variation in performance of the water repellent film 14. Therefore, the formation of the water repellent film 14 is preferably performed at the final stage. The nozzle 12 may be performed by etching. In addition, the size of the nozzle 12 may be set to have a diameter of 10 to 30 μm.

For example, the nozzle 12 is formed by performing a hole processing with respect to the nozzle plate 10 formed from, for example, a silicon (Si) base material, and the forming of the water repellent film 14 is performed in the nozzle plate 10 on a nozzle 12 forming surface side thereof using a fluorine-based silane coupling agent.

The water repellent film 14 may be formed by using, for example, physical vapor deposition such as a vapor deposition method. The vapor deposition method is a method in which a film forming substrate is set inside a vacuum chamber, and a material that is desired to be formed in the vacuum chamber is vaporized under the vaporizing condition (that is, a condition at which a vapor pressure becomes sufficient) to form a film. In a case of a silane coupling agent, a method in which the silane coupling agent is heated to be vaporized so as to form a film is generally used. In addition, the water repellent film 14 may be formed even in a liquid phase method using an immersing treatment or a spin coat method.

As the fluorine-based silane coupling agent, it is preferable to use a fluorine type, a methoxy type, an ethoxy type, an isocyanate type, or the like. The silane coupling agent is a silicon compound expressed by $Y_nSiX_{4-n}$ (n=1, 2, 3). Y represents a group including a relatively inert group such as an alkyl group, or a reactive group such as a vinyl group, an amino group, and an epoxy group. X represents a group that is bondable by condensation with a hydroxyl group or absorbed water on a surface of a substrate such as halogen, a methoxy group, an ethoxy group, and an acetoxy group. The silane coupling agent is widely used during manufacturing a composite material such as glass fiber reinforced plastic composed of an organic material and an inorganic material so as to mediate bonding of the composite material. In a case where Y is the inert group such as the alkyl group, properties such as prevention of adhesion or friction, maintenance of gloss, water repellency, and lubrication are applied to a modified surface. In addition, in a case of including the reactive group, the silane coupling is mainly used for improvement of adhesiveness.

Furthermore, a surface, which is modified by using a fluorine-based silane coupling agent to which a linear fluorocarbon chain is introduced to Y, has low surface free energy like a surface of PTFE (polytetrafluoroethylene), and properties such as water repellency, lubrication, and release are improved, and thus oil repellency.

Examples of linear fluoroalkylsilanes include $Y{=}CF_3CH_2CH_2$, $CF_3(CF_2)_3CH_2CH_2$, $CF_3(CF_2)_7CH_2CH_2$, and the like.

In addition, a material having a perfluoroether (PFPE) group ($—CF_2—O—CF_2—$) may be used for Y portion.

In addition, as the silane coupling agent, a material $X_3SiYSiX_3$ in which the silane coupling group is bonded not only at one side but also at both sides may be used.

In addition, a commercially available silane coupling water repellent material such as OPTOOL (trade name, manufactured by Daikin Industries, Ltd.,), DURASURF (trade name, manufactured by HARVES CO., Ltd), Novec EGC1720 (trade name, manufactured by Sumitomo 3M Limited), Fluorolink S-10 (trade name, manufactured by Solvay Solexis Inc.), NANOS (trade name, manufactured by T&K Corporation), SIFEL KY-100 (trade name, manufactured by Shin-Etsu Chemical Co., Ltd), and CYTOP M-type (trade name, manufactured by AGC chemicals) may be used.

However, since Si or a natural oxide film $SiO_2$ is exposed at the inside of the nozzle 12, the water repellent film 14 is also formed at the inside of the nozzle 12 by a silane coupling bonding. Therefore, it is necessary to remove the water repellent film 14 inside the nozzle 12 with only the water repellent film 14 on the surface of the nozzle plate 10 being left.

(2) Protective Film Adhering Process

Figure 4C:
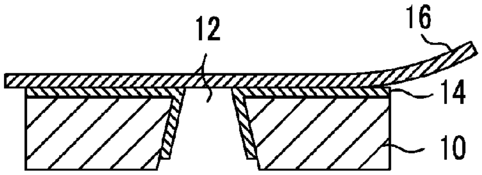
Figure 5:
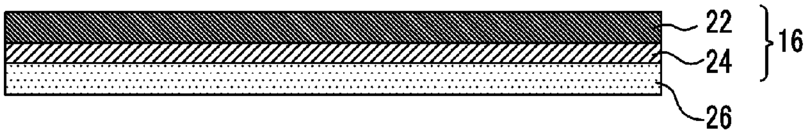
FIG. 5 is a cross-sectional diagram of a protective film.

Next, as shown in FIG. 4C, a protective film 16 is adhered to a place at which the water repellent film 14 is desired to be left. FIG. 5 shows a cross-sectional diagram of the protective film 16. The protective film 16 includes a substrate base 22 and an adhesion material 24 that is applied to the substrate base 22. A release film 26, which is peeled at the time of being used, is provided at a side at which the adhesion material 24 of the protective film 16 is applied. The adhesion of the protective film includes a peeling of the release film 26, and the protective film 16 is adhered to an object by bringing the adhesion material 24 side into contact with the object. As the protective film 16, for example, a weak adhesive film may be used, in which a polyester film having a thickness of 80 μm is used as the substrate base 22 and an olefin-based elastomer is used as the adhesion material 24. In this embodiment, it is important that the protective film 16, that is, the substrate base 22 and the adhesion material 24 do not include polysiloxane, for example, polydimethylsiloxane (PDMS, commonly referred to as silicone) having a functional group of $(CH_3)_2SiO$. Hereinafter, polydimethylsiloxane (PDMS) will be described as an example of polysiloxane, but the invention is not limited to PDMS.

Generally, PDMS is widely used as a releasing agent, and is used to improve removability in the protective film. However, a protective film, in which a release property is improved by adding another component without using PDMS in a tape main body, is commercially available. In this embodiment, a protective film, which does not contain PDMS and contains phthalic acid as a plasticizer, is used.

In a case where a film not containing PDMS is used as the protective film 16, it is possible to prevent PDMS from being scattered and thereby being adhered to the surface of the nozzle plate 10 due to a subsequent plasma irradiation process of irradiating the protective film 16 with plasma. When PDMS adheres to the surface, PDMS and a pigment component in ink adhere to each other, and solidify at the adhesion portion. As a result, ejection failure of the ink tends to occur.

In addition, so as to prevent the protective film 16 in the vicinity of the nozzle 12 from being floated during adhering the protective film 16 to the nozzle plate 10, the protective film 16 preferably has air escape property. That is, it is preferable to optimize hardness (softness) of the adhesion material 24. In this embodiment, the "air escape property" refers to a property which prevents or reduces the occurrence of residual air bubbles, when the protective film is adhered to the nozzle plate 10. The air escape property may be improved, for example, by using the adhesion material 24 having flexibility. The flexibility of the adhesion material 24 is determined based upon, for example, the thickness, rigidity (softness), and/or density, etc. of the adhesion material 24. In a case where the protective film 16 is floated in the vicinity of the nozzle 12, the water repellent film 14 on the surface of the nozzle plate 10 at that position where the float occurs is removed by a subsequent plasma process. As a result, in the nozzle 12, this may lead to ejection failure due to meniscus overflow or nozzle clogging due to attachment of foreign matter in the vicinity of the nozzle 12. Therefore, it is preferable that the protective film 16 be transparent so as to confirm whether or not the protective film 16 is adhered to the nozzle plate 10 without being floated therefrom. In a case where a colored film is used for the protective film 16, even when air is introduced and thus a float occurs, it is difficult to confirm the float from an upper surface of the protective film 16.

In addition, so as to prevent the float of the protective film 16, the protective film 16 may be adhered in a state in which the inside of the nozzle 12 is decompressed. As a result, it is possible to further stably prevent the float of the protective film 16 at an edge portion in the vicinity of the nozzle 12. Furthermore, when an ambient temperature is raised during adhesion of the protective film 16, the protective film 16 is made to be soft, and as a result, the float of the protective film 16 may be prevented.

In addition, when it enters a condition in which the ambient temperature during adhesion of the protective film 16 is raised, the material of the protective film 16 is cured, and thus the float is hard to occur, the number of places, at which of the protective film 16 is floated, may be largely reduced. As a result, the water repellent film 14 that is removed from the surface of the nozzle plate 10 may be reduced, and thus the ejection failure may be reduced. The ambient temperature during adhesion is not particularly limited as long as the temperature does not have an effect on the piezoelectric element 258 of the inkjet head 250 and a resin of an adhesive, but the temperature is preferably 30 to 100° C.

The protective film 16 is not limited to the above-described film in which the polyester film is used for the substrate base 22 and the olefin-based elastomer is used for the adhesion material 24, and other materials may be used. For example, a polyimide material or a polypropylene material may be used as the substrate base 22, and an acrylic material may be used as the adhesion material 24.

In addition, since PDMS is not contained in the main body of the protective film 16, it is preferable that PDMS be contained in the release film 26 so as to easily peel the release film 26 that is peeled when the protective film 16 is used. Therefore, a release property of the release film 26 from the protective film 16 may be maintained. In a case where PDMS is not contained in the release film 26, it is difficult to peel the release film 26 from the protective film 16.

(3) Plasma Irradiation Process

Figure 4D:
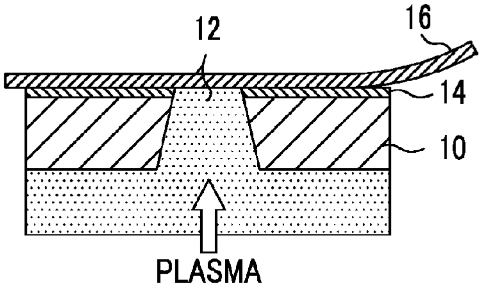

Next, as shown in FIG. 4D, the inside of the nozzle 12 is subjected to a plasma treatment. Therefore, the inside of the nozzle 12 is exposed to plasma, and thus the water repellent film 14 inside the nozzle 12 is removed.

Figure 6:
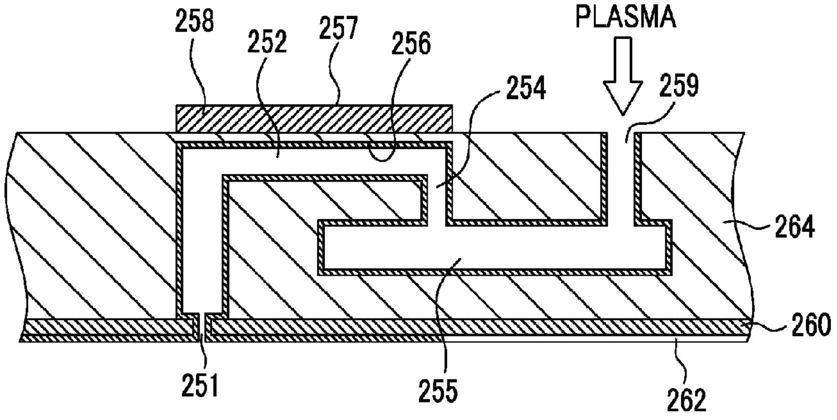
FIG. 6 is a diagram illustrating a method of a plasma treatment.

As a plasma treatment method, for example, the following method may be exemplified. That is, the nozzle plate 10 is disposed in a vacuum chamber, and the vacuum chamber is evacuated, and then oxygen substitution is performed to generate oxygen plasma. As an oxygen plasma generating condition, for example, the following conditions may be exemplified. That is, an output is set to 30 W, a flow rate is set to 30 sccm, and plasma is generated for 15 minutes. As shown in FIG. 6, plasma irradiation may be performed to remove the water repellent film 14 in such a manner that the plasma reaches the inside of the nozzle 251 through the pressure chamber 252 after passing through the ink supply port 259 that is an introduction side of a liquid flow path and a discharge side (not shown).

In addition, in a case where the piezoelectric element 258 is directly exposed to plasma, deterioration of the piezoelectric element 258 may be caused, and thus the piezoelectric element 258 is covered with a silicon plate in order for the piezoelectric element 258 not to be directly exposed to plasma.

In addition, the plasma treatment process is not limited to the above-described vacuum decompression plasma, and atmospheric pressure plasma by gas flow may be used. In this case, it is confirmed that inkjet head 250, which is manufactured by using dry air or nitrogen ($N_2$) as the gas flow and under plasma generating conditions in which a voltage is set to 15 kV, a frequency is set to 100 Hz, an output is set to 150 W, and a gas flow rate is set to 20 to 40 L/min, achieves the same ejection property as the inkjet head 250 that is formed by the vacuum decompression plasma, and that the water repellent film 14 inside the nozzle 12 is removed.

(4) Protective Film Peeling Process

Figure 4E:
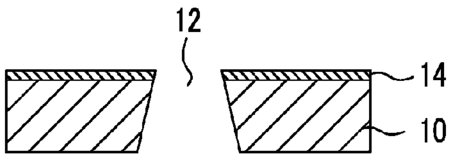

Finally, as shown in FIG. 4E, the protective film 16 is peeled and removed from the surface of the nozzle plate 10, whereby the inkjet head 250 is manufactured.

In a general protective film, PDMS that is a release component is contained to improve removability. In the invention, the protective film 16 not containing PDMS is used. However, since the protective film is adhered to the fluorine-based water repellent film 14, even when the PDMS is not contained, satisfactory removability may be obtained.

In addition, as described above, since the piezoelectric element 258 for driving, and the like are formed in advance in the nozzle plate 10, when heat is applied to the nozzle plate 10 during peeling the protective film 16, stress may be applied to the piezoelectric element 258. In addition, when the nozzle plate 10 is irradiated with UV, an adhesive that is used during manufacturing the nozzle plate 10 deteriorates, and thus damage may be applied to a resin. Therefore, it is necessary to peel the protective film 16 under conditions in which heat is not applied to the nozzle plate 10 or the nozzle plate 10 is not irradiated with UV. In the invention, even when PDMS is not used, the water repellent film 14 to which the protective film 16 is adhered is formed from a fluorine-based material, and thus removability may be improved.

EXAMPLES

Ejection Test

Durability evaluation of continuous ejection using pigment ink was performed by using the liquid droplet ejection head (inkjet head) that was manufactured by the above-described method. In addition, as a comparative example, evaluation was performed with respect to a liquid droplet ejection head that was manufactured by using a protective film containing PDMS.

Ink ejection driving conditions were set in such a manner that pigment ink was used, a driving voltage of a piezoelectric body for driving was set to 30 V, and a frequency was set to 100 kHz. In addition, in regard to printing, ejection failure was determined in a case where an ejection direction varied by 20 μm from a target printing position. Non-ejection of a nozzle was also determined as ejection failure. In addition, cleaning maintenance of a nozzle face was also performed by a wiping operation for every 0.5 hundred million dots.

In a case of a liquid droplet ejection head that was manufactured by using a general protective film containing PDMS, in a continuous printing test of one billon dots, ejection failure of approximately 15% was occurred. On the other hand, in a case of a liquid droplet ejection head that was manufactured by using a protective film not containing PDMS, in a continuous printing test of one billion dots, an ejection failure rate was less than 1%.

Examination on Cause of Ejection Failure

Next, examination regarding a cause of ejection failure in the liquid droplet ejection head that was manufactured by using the PDMS-containing protective film was performed. A composition analysis in the vicinity of a defective nozzle was performed by TOF-SIMS. In the composition analysis, SIMS IV manufactured by ION-TOF was used. As a result thereof, in the vicinity of a portion that connects to a nozzle on a surface of a nozzle plate, an amount of CF was decreased, and a PDMS component containing SiCH was specifically detected. On the other hand, in the liquid droplet ejection head manufactured by using the protective film in which the ejection failure rate is low and which does not contain the PDMS component, PDMS was not detected. From this, it was confirmed that the pigment component of ink has a tendency to strongly adhere and thus ink solidification has a tendency to occur when the PDMS component is adhered to the surface of the nozzle plate.

Figure 7A:
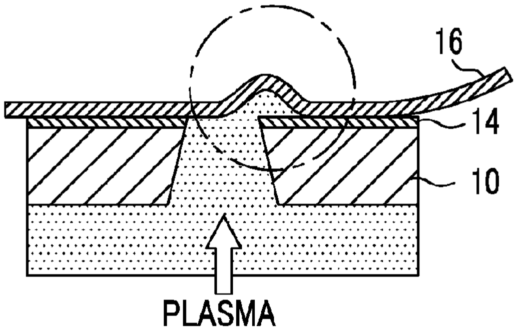
FIGS. 7A and 7B are diagrams for explaining a problem in a manufacturing method of the related art.
Figure 7B:
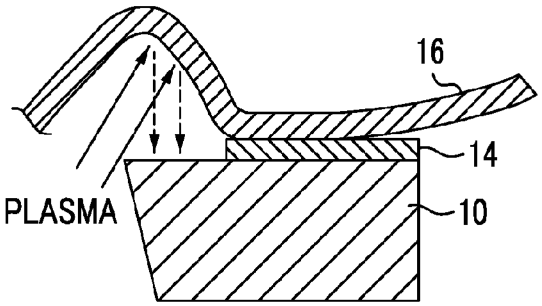

Verification of adhesion of the PDMS component only in the vicinity of a nozzle was performed by using the PDMS-containing protective film. The vicinity of the nozzle was observed by a microscope after the protective film was adhered to the nozzle face. As a result thereof, as shown in FIGS. 7A and 7B, it was confirmed that the protective film 16 was floated at a portion in the vicinity of several nozzles, i.e., at a portion that connects to a nozzle. In addition, it was confirmed that air was not discharged completely at a portion not only in the vicinity of the nozzle but also at the periphery of the nozzle, i.e., at a portion at which a gap was present between the nozzle and the protective film, and thus the protective film 16 was floated. Then, an ejection test was performed after the water repellent film inside the nozzle was removed by a plasma treatment, and the protective film was peeled. As a result thereof, a nozzle in the vicinity of a portion at which a film float due to air occurred and an ejection failure nozzle were approximately coincident with each other. FIG. 7B shows an enlarged diagram of a portion in the vicinity of a nozzle shown in FIG. 7A. As shown in FIG. 7B, since the protective film 16 was floated at a portion in the vicinity of the nozzle, the water repellent film 14 in the vicinity of the nozzle, at which the protective film 16 was floated, was removed. In addition, it is considered that when the protective film 16 was irradiated with plasma, the PDMS component of the protective film 16 adheres to a surface of the nozzle plate. Therefore, it is considered that since the pigment component of ink adheres to PDMS, which adheres to the surface of the nozzle plate, and precipitates and solidifies, the ejection failure occurs. In addition, it was also confirmed that the air float portion of the nozzle other than the portion in the vicinity of the nozzle is not particularly related to the ejection failure.

Since water repellency decreases at an abnormal portion of the water repellent film, when liquid having a low surface tension is applied to a nozzle face, the liquid remains only in the vicinity of the abnormal nozzle. Therefore, after performing a process of removing a water repellent film on an inner surface of a nozzle by a plasma treatment, detection of the abnormal nozzle may be performed by wiping the nozzle face with liquid having a low surface tension and performing examination on the total nozzles. As the liquid having a low surface tension, an aqueous solution of 30 mN/m was used. Immediately after the nozzle face was wiped, automatic image capturing was performed using a nozzle examining microscope, and an abnormal nozzle was detected by image processing. In addition, even in a case the float occurs due to air, evaluation may be effectively performed by using the device as mentioned above that examines total nozzles.

With the examination as described above, it was confirmed that when the inside of the nozzle was irradiated with plasma to remove the water repellent film, plasma flowed to the surface of the nozzle plate at the air float portion connecting to the nozzle, and as a result thereof, the water repellency of the surface of the nozzle plate in the vicinity of the nozzle was decreased. Specifically, it was confirmed that an amount of CF having a water repellent function (water repellent film) decreased, and PDMS that is a component of the protective film was dispersed and adhered due to the plasma irradiation.

In addition, in a case where the ambient temperature during adhesion of the protective film is raised to soften the tape material and thus it becomes a condition in which the float is hard to occur, the number of places, at which the protective film is floated, may greately decrease, and as a result thereof, it was confirmed that the ejection failure decreases, and thus the above described mechanism is proved.

However, since even in a case where the adhesion is performed at a high temperature, it is basically difficult to avoid the adhesion of PDMS, it is important to exclude the PDMS component basically from the protective film.

In a case of using a film not containing PDMS, PDMS was not detected in the vicinity of a nozzle, and an ink solidification phenomenon did not occur.

What is claimed is:

1. A method of manufacturing a liquid droplet ejection head, the method comprising:

forming a water repellent film on a surface of a nozzle forming substrate having a nozzle hole and on a side wall of the nozzle hole;

adhering a protective film on a surface of the water repellent film that is formed on the surface of the nozzle forming substrate, wherein the protective film has a release film on at least one surface thereof, the release film containing polysiloxane;

peeling the release film from the protective film before the adhering of the protective film;

removing the water repellent film formed on the side wall of the nozzle hole by a plasma treatment; and peeling the protective film, wherein polysiloxane is not contained in an adhesion component and a base material of the protective film.

2. The method of manufacturing a liquid droplet ejection head according to claim 1, wherein, before the forming of the water repellent film, a flow path forming substrate, in which a flow path through which an ejected liquid flows and a pressure chamber are formed, is adhered to the nozzle forming substrate, and a piezoelectric element for driving and an interconnection are formed in the flow path forming substrate.

3. The method of manufacturing a liquid droplet ejection head according to claim 2, wherein the protective film has air escape property.

4. The method of manufacturing a liquid droplet ejection head according to claim 2, wherein the protective film is optically transparent.

5. The method of manufacturing a liquid droplet ejection head according to claim 2, wherein the adhering of the protective film is performed under a condition in which an inside of the nozzle hole is decompressed.

6. The method of manufacturing a liquid droplet ejection head according to claim 2, wherein the adhering of the protective film is performed under a heated atmosphere.

7. The method of manufacturing a liquid droplet ejection head according to claim 2, wherein in the forming of the water repellent film, the water repellent film is formed from a fluorine-based silane coupling agent.

8. The method of manufacturing a liquid droplet ejection head according to claim 2, wherein in the forming of the water repellent film, the water repellent film is formed by vapor deposition of a fluorine-based silane coupling agent.

9. The method of manufacturing a liquid droplet ejection head according to claim 2, wherein in the removing of the water repellent film, the plasma treatment is performed by a vacuum decompression plasma treatment.

10. The method of manufacturing a liquid droplet ejection head according to claim 2, wherein in the removing of the water repellent film, the plasma treatment is performed by an atmospheric pressure plasma treatment using gas flow.

11. The method of manufacturing a liquid droplet ejection head according to claim 1, wherein the protective film has air escape property.

12. The method of manufacturing a liquid droplet ejection head according to claim 1, wherein the protective film is optically transparent.

13. The method of manufacturing a liquid droplet ejection head according to claim 1, wherein the adhering of the protective film is performed under a condition in which an inside of the nozzle hole is decompressed.

14. The method of manufacturing a liquid droplet ejection head according to claim 1, wherein the adhering of the protective film is performed under a heated atmosphere.

15. The method of manufacturing a liquid droplet ejection head according to claim 1, wherein in the forming of the water repellent film, the water repellent film is formed from a fluorine-based silane coupling agent.

16. The method of manufacturing a liquid droplet ejection head according to claim 1, wherein in the forming of the water repellent film, the water repellent film is formed by vapor deposition of a fluorine-based silane coupling agent.

17. The method of manufacturing a liquid droplet ejection head according to claim 1, wherein in the removing of the water repellent film, the plasma treatment is performed by a vacuum decompression plasma treatment.

18. The method of manufacturing a liquid droplet ejection head according to claim 1, wherein in the removing of the water repellent film, the plasma treatment is performed by an atmospheric pressure plasma treatment using gas flow.

* * * * *